(12) United States Patent
Tatipamula et al.

(10) Patent No.: US 10,928,490 B2
(45) Date of Patent: Feb. 23, 2021

(54) LIDAR CALIBRATION

(71) Applicant: Ford Global Technologies, LLC, Dearborn, MI (US)

(72) Inventors: Sagar Avaneendra Tatipamula, Canton, MI (US); Mohamed Aladem, North Aurora, IL (US); Barnabas J. Nemec, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 641 days.

(21) Appl. No.: 15/697,729

(22) Filed: Sep. 7, 2017

(65) Prior Publication Data

US 2019/0072650 A1 Mar. 7, 2019

(51) Int. Cl.
| | |
|---|---|
| G01S 7/48 | (2006.01) |
| G01S 7/4861 | (2020.01) |
| G01S 7/481 | (2006.01) |
| G01S 7/497 | (2006.01) |
| G01S 17/42 | (2006.01) |
| G01S 17/88 | (2006.01) |
| G06K 9/00 | (2006.01) |

(52) U.S. Cl.
CPC ........... G01S 7/4861 (2013.01); G01S 7/4811 (2013.01); G01S 7/497 (2013.01); G01S 17/42 (2013.01); G01S 17/88 (2013.01); G06K 9/00624 (2013.01)

(58) Field of Classification Search
CPC ..................................................... G01S 7/497
See application file for complete search history.

(56) References Cited

U.S. PATENT DOCUMENTS

| | | | |
|---|---|---|---|
| 5,825,464 A | 10/1998 | Feichtner | |
| 7,797,120 B2 | 9/2010 | Walsh | |
| 8,368,876 B1 | 2/2013 | Johnson et al. | |
| 9,423,256 B2 | 8/2016 | Le Scouarnec et al. | |
| 2006/0036170 A1* | 2/2006 | Lachaine | A61B 8/4245 600/437 |
| 2010/0076709 A1* | 3/2010 | Hukkeri | G01S 7/4021 702/94 |
| 2017/0343654 A1* | 11/2017 | Valois | G01S 7/497 |

FOREIGN PATENT DOCUMENTS

| | | |
|---|---|---|
| CN | 204331026 U | 5/2015 |
| CN | 105807271 A | 7/2016 |
| DE | 102009047324 A1 | 6/2011 |

* cited by examiner

*Primary Examiner* — Hovhannes Baghdasaryan
(74) *Attorney, Agent, or Firm* — Frank A. MacKenzie; Bejin Bieneman PLC

(57) ABSTRACT

A control computer includes a computer memory and a computer processor programmed to execute instructions stored in the memory to perform a lidar calibration test. The instructions include collecting texture data output by a lidar sensor, the texture data representing a detected texture of an interior surface of a first jig disposed about the lidar sensor, comparing the texture data output by the lidar sensor to a known texture of the interior surface of the first jig, determining that the lidar sensor needs to be calibrated as a result of comparing the texture data to the known texture, and calibrating the lidar sensor by uploading updated values for use with the lidar sensor.

13 Claims, 6 Drawing Sheets

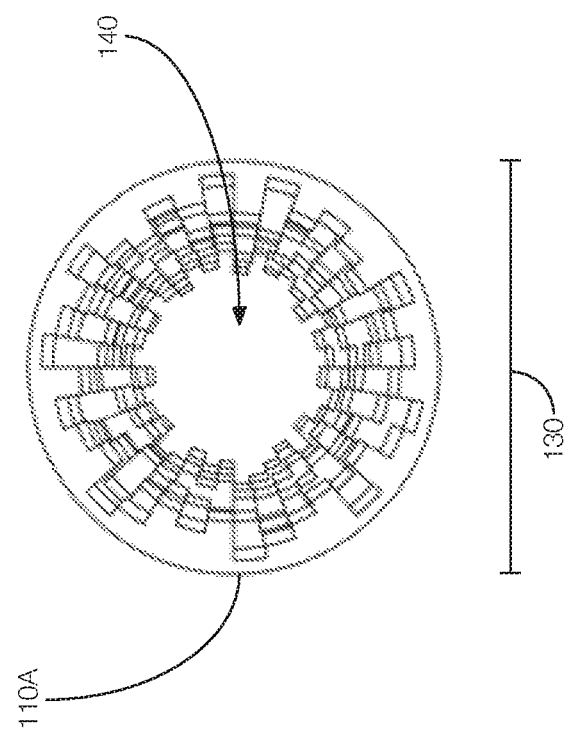
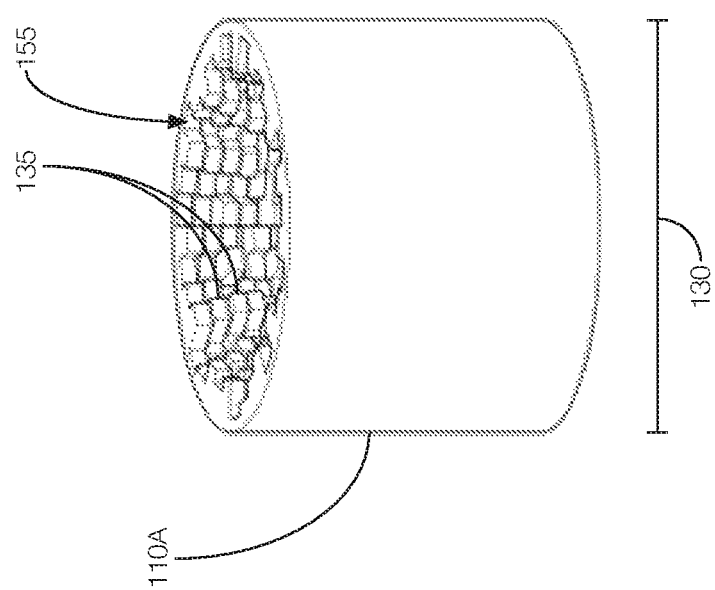
FIGURE 3B
FIGURE 3A

LIDAR CALIBRATION

BACKGROUND

LIDAR stands for ("Light Detection and Ranging"). Sensors using LIDAR technology are sometimes referred to as "lidar sensors." Lidar sensors have a number of applications, one of which is in autonomous vehicles. Lidar sensors help the autonomous vehicle detect nearby objects.

BRIEF DESCRIPTION OF THE DRAWINGS

FIGS. 3A and 3B illustrate various perspective views of a first example jig that may be used to calibrate the lidar sensor.

DETAILED DESCRIPTION

Figure 1:
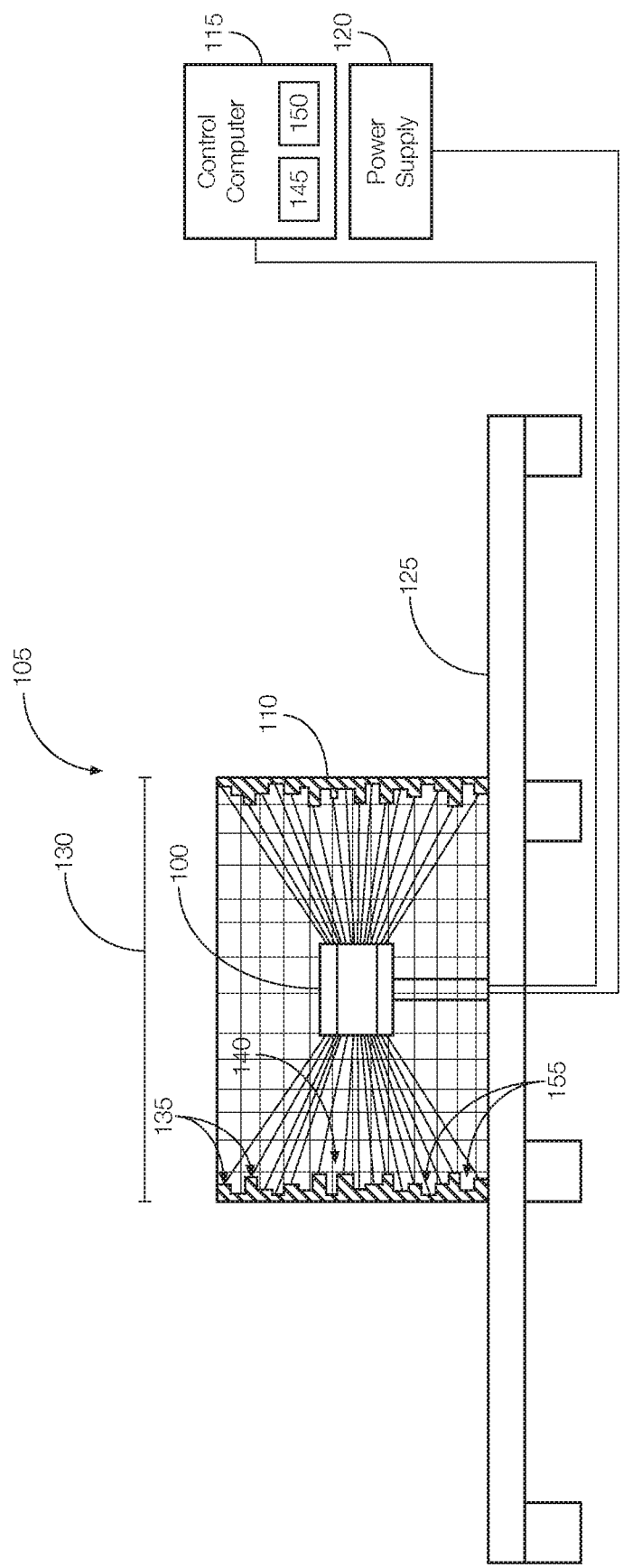
FIG. 1 illustrates an example calibration apparatus for calibrating a lidar sensor.

Lidar sensors may be calibrated periodically to confirm that the sensor readings are accurate. Calibrating a lidar sensor involves placing the lidar sensor a known distance from an object, comparing the sensor readings to the known distance, and adjusting the programming of the lidar sensor so that the distance measured by the lidar sensor matches that of the known object. This process is repeated with the object moved to different known distances, heights, etc. Because the object is moved frequently, calibrating the lidar sensor can take a long time and can also be imprecise. For example, it requires a person to manually move the object relative to the lidar sensor in between each sensor reading. It also requires the person to accurately measure the distance of the lidar sensor to the object.

A calibration apparatus can be used to more accurately determine whether the lidar sensor is properly calibrated. The calibration apparatus may include a control computer. A control computer includes a computer memory and a computer processor programmed to execute instructions stored in the memory to perform a lidar calibration test. The instructions include collecting texture data output by a lidar sensor, the texture data representing a detected texture of an interior surface of a first jig disposed about the lidar sensor, comparing the texture data output by the lidar sensor to a known texture of the interior surface of the first jig, determining that the lidar sensor needs to be calibrated as a result of comparing the texture data to the known texture, and calibrating the lidar sensor by uploading updated values for use with the lidar sensor.

The computer processor may be programmed to activate the lidar sensor by outputting an activation control signal to the lidar sensor prior to collecting texture data output by the lidar sensor.

In some implementations, the computer processor may be programmed to deactivate the lidar sensor by outputting a deactivation control signal to the lidar sensor after collecting the texture data output by the lidar sensor.

Alternatively or in addition, the computer processor may be programmed to repeat the lidar calibration test with a second jig. An interior surface of the second jig may have a different known texture than that of the first jig. In that instance, the computer processor may be programmed to wait for the first jig to be removed and for the second jig to be disposed about the lidar sensor before repeating the lidar calibration test with the second jig.

The computer processor may be programmed to determine a form factor of the lidar sensor. In that instance, the computer processor is programmed to calibrate the lidar sensor based at least in part on the form factor of the lidar sensor.

An example method of performing the lidar calibration test includes collecting texture data output by a lidar sensor, the texture data representing a determined texture of an interior surface of a first jig disposed about the lidar sensor, comparing the texture data output by the lidar sensor to a known texture of the interior surface of the first jig, determining that the lidar sensor needs to be calibrated as a result of comparing the texture data to the known texture, and calibrating the lidar sensor by applying updated values for use with the lidar sensor.

The method may further include activating the lidar sensor by outputting an activation control signal to the lidar sensor prior to collecting texture data output by the lidar sensor.

The method may further include deactivating the lidar sensor by outputting a deactivation control signal to the lidar sensor after collecting the texture data output by the lidar sensor.

The method may further include repeating the lidar calibration test with a second jig. An interior surface of the second jig may have a different known texture than that of the first jig. The method may further include waiting for the first jig to be removed and for the second jig to be disposed about the lidar sensor before repeating the lidar calibration test with the second jig.

The method may further include determining a form factor of the lidar sensor. In that instance, the method may further include calibrating the lidar sensor based at least in part on the form factor of the lidar sensor.

A calibration apparatus includes a first jig configured to receive a lidar sensor during a lidar calibration test. The first jig has an interior surface with a first known texture. The calibration apparatus also includes a control computer programmed to collect texture data output by the lidar sensor, the texture data representing a determined texture of the interior surface of the first jig, wherein the control computer is further programmed to compare the texture data output by the lidar sensor to the first known texture, determine that the lidar sensor needs to be calibrated as a result of comparing the texture data to the first known texture, and calibrate the lidar sensor by uploading updated values for use with the lidar sensor.

The control computer may be programmed to activate the lidar sensor by outputting an activation control signal to the lidar sensor prior to collecting texture data output by the lidar sensor and deactivate the lidar sensor by outputting a deactivation control signal to the lidar sensor after collecting the texture data output by the lidar sensor.

The control computer may be programmed to repeat the lidar calibration test with a second jig. The interior surface of the second jig has a second known texture different from the first known texture. The control computer may be programmed to wait for the first jig to be removed and the second jig to be disposed about the lidar sensor before repeating the lidar calibration test with the second jig.

The control computer may be programmed to determine a form factor of the lidar sensor. In that implementation, the control computer may be programmed to calibrate the lidar sensor based at least in part on the form factor of the lidar sensor.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 2:
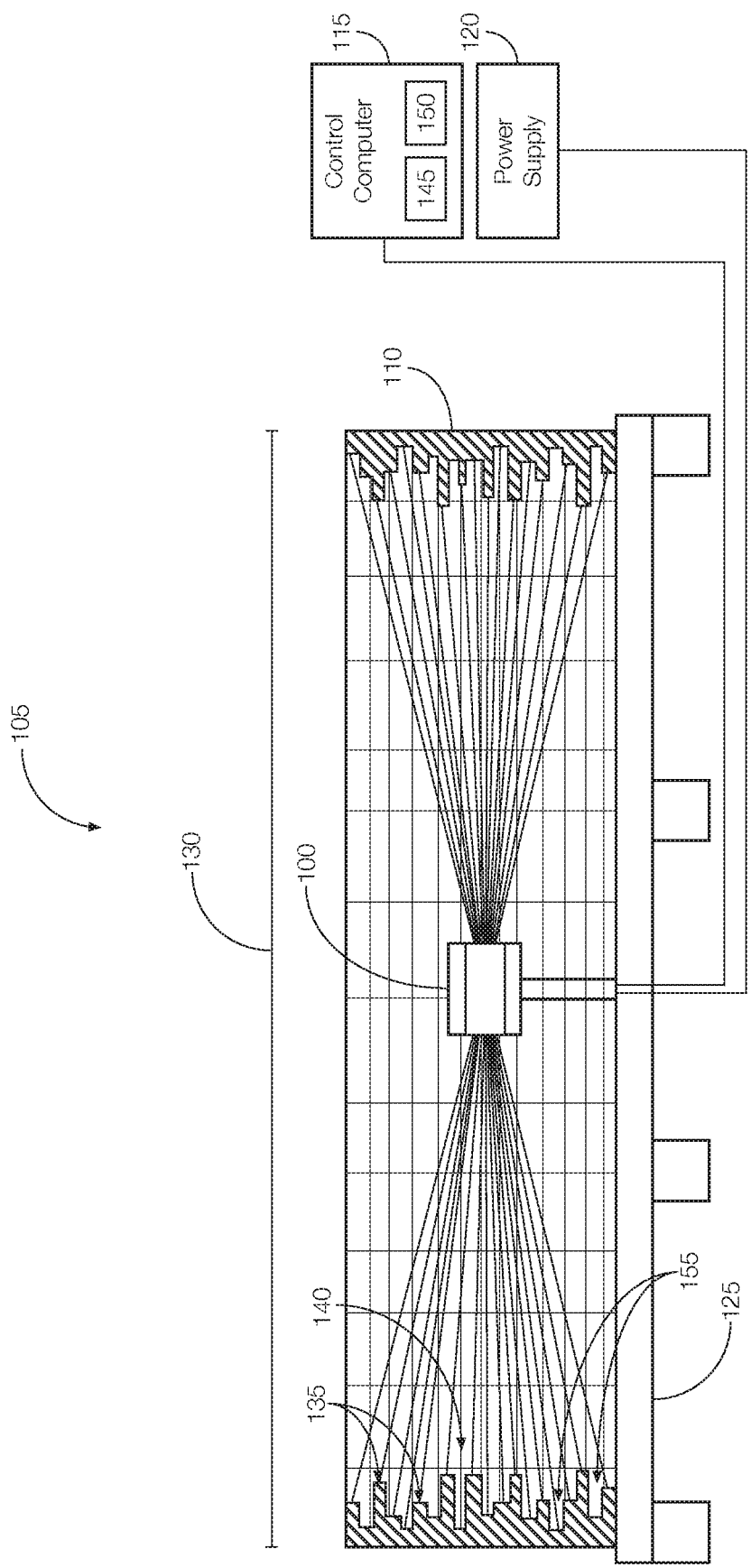
FIG. 2 illustrates another example apparatus for calibrating a lidar sensor.
Figure 3D:
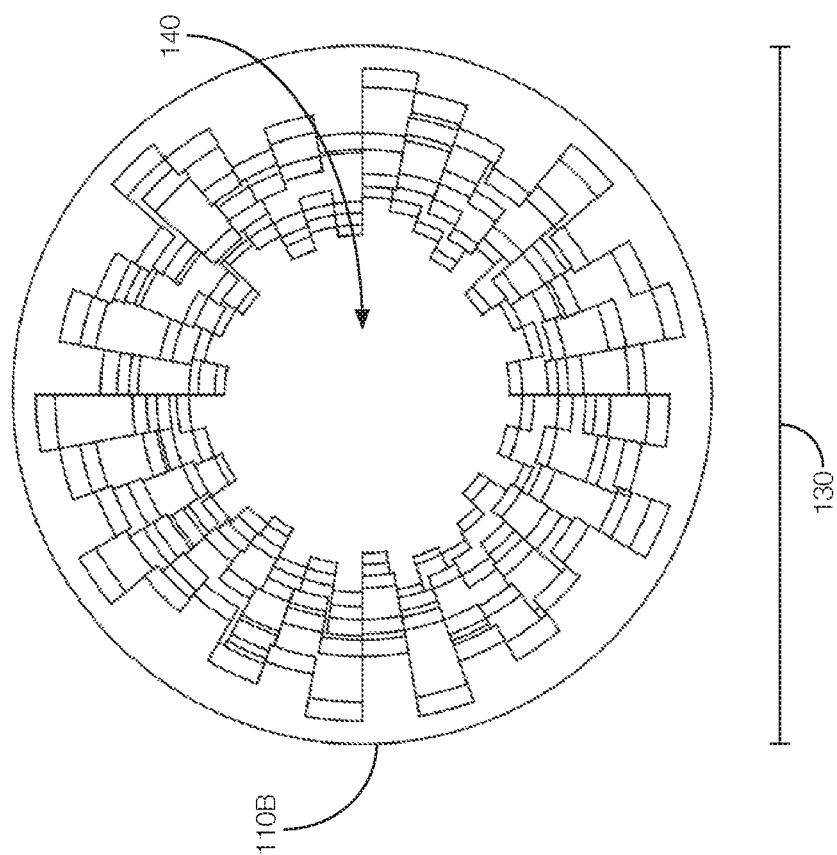
FIGS. 3C and 3D illustrate various perspective views of a second example jig that may be used to calibrate the lidar sensor after using the first jig.
Figure 3C:
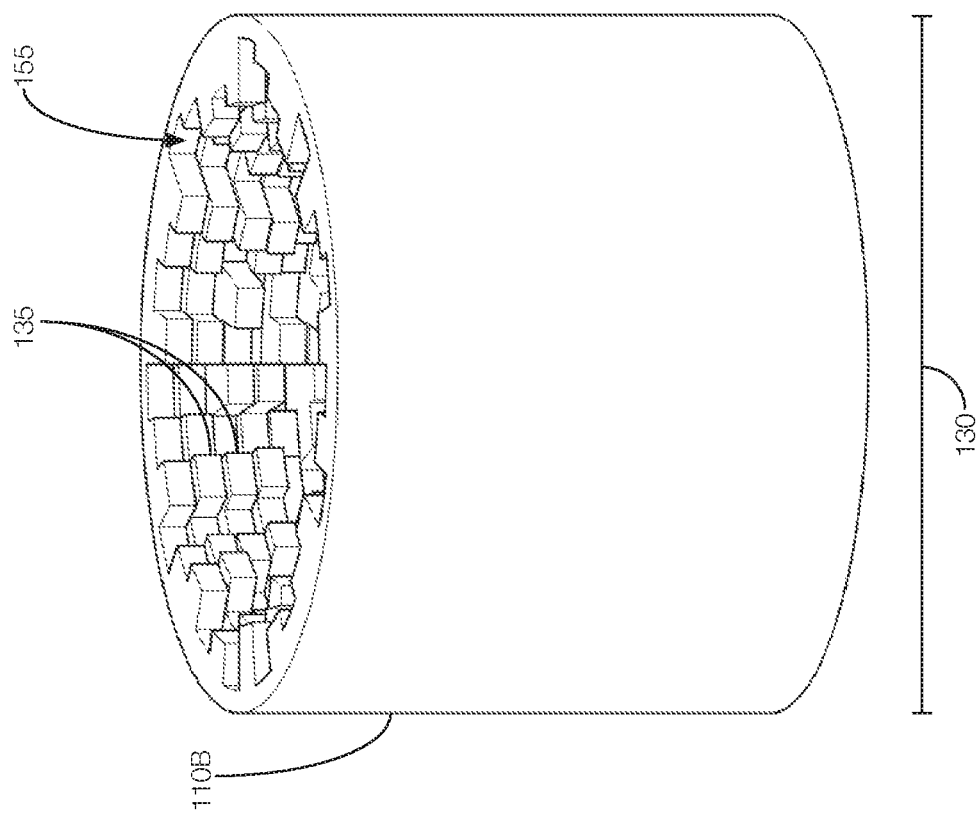

As illustrated in FIGS. 1 and 2, during calibration, a lidar sensor 100 is mounted to a calibration apparatus 105 that includes a jig 110, a control computer 115, and a power supply 120. At least some components of the calibration apparatus 105, such as the jig 110, may be mounted to a calibrator base 125.

The lidar sensor 100 is implemented via lasers, laser light detectors, circuits, chips, or other electronic components that can determine the distance to an object based on laser light reflected from the object. The lidar sensor 100 activates one or more of the lasers to project laser light toward an object. The lidar detects the laser light that reflects off the object. The amount of time between transmitting and receiving the reflected laser light is used for calculating the distance of the object. If multiple lasers are used, including lasers projected at different angles from the lidar sensor 100, the lidar sensor 100 can determine a general shape, height, and depth of the object. The lidar sensor 100 may spin to project laser light, and therefore detect objects, around the lidar sensor 100. The lidar sensor 100 may include any number of lasers. For instance, the lidar sensor 100 may transmit laser light from 16 or 32 lasers located in the housing of the lidar sensor 100. The lidar sensor 100 may be programmed to output data representing the object detected. The data may indicate where the object is located relative to the lidar sensor 100, the distance to the object, etc. The collection of data can be used to create a virtual image of the object. During calibration, the data collected by the lidar sensor 100 may be output to the control computer 115.

The jig 110 is a tool for testing the lidar sensor 100. The jig 110 may be formed from a material such as a plastic or metal material. Example jigs 110 are discussed below with reference to FIGS. 3A-3D. The exterior of the jig 110 may have a cylindrical shape with, e.g., a constant outer diameter 130. The interior of the jig 110 may be textured. That is, the interior of the jig 110 may include numerous protrusions 135, recesses 155, or both. The protrusion 135 may each extend from an interior surface 140 of the jig 110. The protrusions 135 may extend different lengths from the interior surface 140 toward the center of the jig 110. Protrusions 135 may be adjacent laterally or longitudinally from one another. Some protrusions 135 may be spaced laterally or longitudinally from one another. Further, the protrusions 135 may have different dimensions. That is, as shown in FIGS. 1 and 2, some protrusion 135 may have different lengths, widths, heights, etc. relative to other protrusions 135, resulting in recesses 155 between at least some of the protrusions 135. Further, "texture" may also or alternatively refer to the size, shape, and reflectivity of the protrusions 135, recesses 155, interior surface 140, etc. Thus, portions of the interior surface 140 may have different shades of contrasting colors that reflect light from the lidar sensor 100 at different intensities. In some instances, the shades of color are arranged in a particular pattern (e.g., like a checkerboard pattern). The texture of the interior surface 140 of the jig 110 may be known to the calibration apparatus 105. That is, the calibration apparatus 105 may know the distance from the center of the jig 110 to each protrusion 135 and recess 155.

During calibration, the lidar sensor 100 may be placed at the center of the jig 110. In other words, the jig 110 may be disposed about the lidar sensor during the calibration test. When the lidar sensor 100 is activated, laser light projected by the lidar sensor 100 may be reflected by the protrusions 135 and recesses 155 back to the lidar sensor 100. The lidar sensor 100 may output texture data representing the determined texture of the interior surface 140 of the jig 110. The texture data may include the distance to each protrusion 135 or recess 155 detected by the lidar sensor 100.

While generally shown as flat, the recesses 155 and the edges of the protrusions 135 may have other geometries. For instance, the edges of the protrusion 135 may be rounded, either concave or convex, and the recesses 155 may be akin to dimples appearing on the interior surface 140 of the jig 110. Further, the calibration apparatus 105 may use multiple jigs 110 of varying sizes to improve the calibration of the lidar sensor 100. For example, the jig 110 in the example of FIG. 1 is smaller than the jig 110 in the example of FIG. 2. This way, the lidar sensor 100 can be calibrated according to different ranges of measurements. That is, one jig 110 (i.e., the smaller jig 110) may have an outer diameter 130 of at least approximately 2-3 meters while another jig 110 (i.e., the larger jig 110) may have an outer diameter 130 of approximately 3-5 meters or larger. This diameter can vary depending on the lidar model and the future advances in lidar technology. The jig 110 may include any number of protrusions 135, and different sized jigs 110 may have the same or different numbers of protrusions 135. It is possible for some jigs 110 to have more than 1000 protrusions 135.

The control computer 115 is implemented via circuits, chips, or other electronic components programmed to process the data output by the lidar sensor 100 and determine if the lidar sensor 100 is properly calibrated based on the data output by the lidar sensor 100. If the lidar sensor 100 is not properly calibrated, the control computer 115 may be programmed to determine appropriate corrections based on, e.g., the form factor of the lidar sensor 100. The appropriate corrections may be in the form of updating values or the weighting of values in the software of the lidar sensor 100, and/or in the processing unit that would be connected to the lidar sensor 100 in its intended application. After making the appropriate corrections, the lidar sensor 100 may be tested again. That is, the lidar sensor 100 may be activated and the data collected by the lidar sensor 100 may be output to the control computer 115 so that additional corrections, if any, may be made. This may continue until the lidar sensor 100 is calibrated for the jig 110. If other jigs 110 are available or otherwise required for the calibration test to continue since using more jigs 110 may result in a more precise calibration for the lidar sensor 100, those jigs 110 may be placed over the lidar sensor 100 so that the control computer 115 can calibrate the lidar sensor 100 for those jigs 110 as well.

The control computer 115 includes a computer memory 145 and a computer processor 150. The computer memory 145 can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The computer memory 145 may store instructions executable by the computer processor 150 and data such as the length of each protrusion 135, the distance of each protrusion 135 from the center of the jig 110, the data collected by the lidar sensor 100, etc. The instructions and data stored in the memory may be accessible to the computer processor 150 and possibly other components of the calibration apparatus 105. The computer processor 150 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor can receive the data output by the lidar sensor 100 and the data stored in the computer memory 145 and determine, from the data, whether the lidar sensor 100 needs to be calibrated. If so, the computer processor 150 can make the appropriate corrections to the lidar sensor 100 by uploading updated values, including updated form factor values, to the lidar sensor 100 or another processing unit involved in the operation of the lidar sensor 100.

The power supply 120 is implemented via circuits, chips, or other electronic components that supply electrical energy to the lidar sensor 100 during calibration. The power supply 120 may include, e.g., transformers and other circuitry to provide the lidar sensor 100 with sufficient electrical energy to operate while undergoing the calibration process.

FIGS. 3A-3D show example perspective side views (FIGS. 3A and 3C) and example perspective top views (FIGS. 3B and 3D) of example jigs 110. The jigs 110, referred to as "the first jig 110A" (FIGS. 3A and 3B) and "the second jig 110B" (FIGS. 3C and 3D), has a cylindrical shape with a constant outer diameter 130 (e.g., circular from a top view) and a textured inner surface 140. Alternatively, the jigs 110 may have an oval shape from a top view. Other shapes may include spherical shapes, rectangular shapes, triangular shapes, etc. Further, different jigs 110 may have different geometries. By way of example only, the first jig 110A may be cylindrical while the second jig 110B may be spherical. Additionally or in the alternative, the first jig 110A and the second jig 110B may have the same shape (e.g., cylindrical) but different outer diameters 130. That is, the first jig 110A may be smaller than the second jig 110B. During the calibration test, only one jig 110 is located about the lidar sensor 100 at a time.

The interior of each jig 110, as shown, is textured. As such, the interior surface 140 of the jig 110 defines numerous protrusions 135 and recesses 155, with each protrusion 135 extending from the interior surface 140 of the jig 110. The protrusions 135 extend different lengths from the interior surface 140 toward the center of the jig 110. Protrusions 135 may be adjacent laterally or longitudinally from one another. Some protrusions 135 may be spaced laterally or longitudinally from one another. There is a space at the center of the jig 110 for the lidar sensor 100. In other words, no protrusions 135 extend to the center of the jig 110 since such protrusions 135 would interfere with the placement of the lidar sensor 100 at the center of the jig 110. The arrangement of protrusions 135 in the first jig 110A may be different from the arrangement of protrusions 135 in the second jig 110B.

As mentioned above, the edges of the protrusions 135 may have other shapes or contours. For instance, the edges may be rounded, angled, or both. The protrusions 135 may extend perpendicular to the interior surface 140 (as shown) or may extend at another angle from the interior surface 140. Different protrusions 135 may extend at different angles. For instance, each protrusion 135 may extend toward the center of the jig 110. Thus, some protrusions 135, such as protrusions 135 near the bottom of the jig 110, may extend upward while other protrusions 135, such as protrusions 135 near the top of the jig 110, may extend downward.

To give the texture a "random" appearance, the protrusions 135 may be arranged in an unspecified manner, meaning that protrusions 135 of different lengths may be located next to one another (both laterally and longitudinally) along the interior surface 140 of the jig 110. That is not to say that the protrusions 135 are arranged randomly since a random distribution of protrusions 135 of varying lengths could result in some protrusions 135 "blocking" laser light from reaching other protrusions 135. The jigs 110 shown in FIGS. 3A-3D illustrate examples of jigs 110 with protrusions 135 arranged in an unspecified manner. An alternative implementation is for the protrusions 135 to be arranged in a more orderly fashion. For instance, the protrusions 135 in a particular row or column may extend the same length, and the lengths may gradually increase or decrease from row-to-row or column-to-column. The changes in lengths may be relative to a reference row or column. The reference row may be the top row, the bottom row, the center row, or any other row. The location of the reference column may not matter since the jig 110 completely surrounds the lidar sensor 100.

Further, the control computer 115 may be programmed with the length of each protrusion 135, the distance of the edge of each protrusion 135 to the center of the jig 110, or both. That way, the control computer 115 (via, e.g., the computer processor 150) can determine whether the lidar sensor 100 needs to be calibrated by, e.g., comparing the data collected by the lidar sensor 100 to the distances of each protrusion 135 stored in the computer memory 145 of the control computer 115 as described below with reference to FIGS. 4 and 5.

Figure 4:
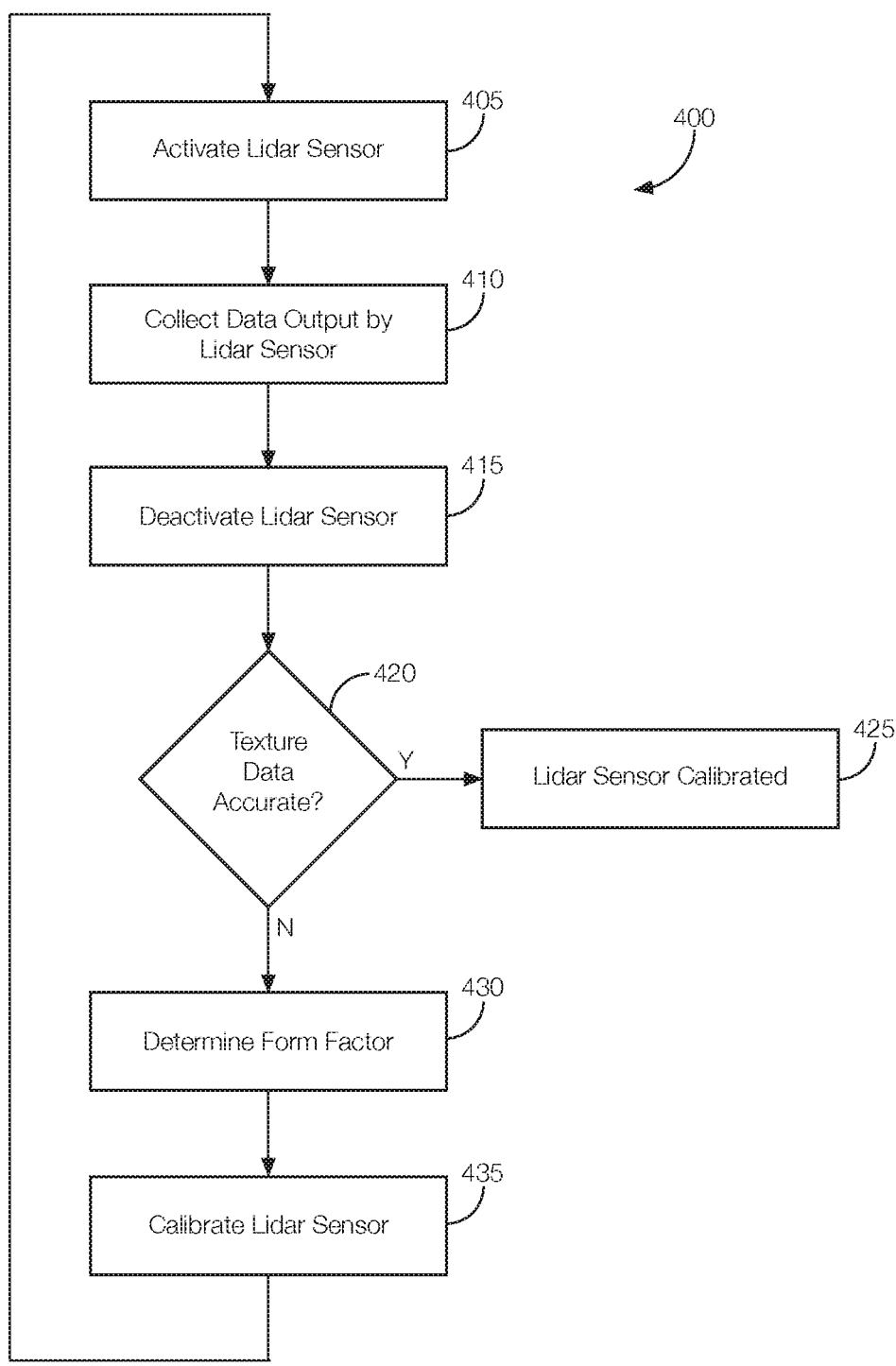
FIG. 4 is a flowchart of an example process that may be executed by a control computer of the calibration apparatus.

FIG. 4 is a flowchart of an example process 400 that may be executed by the control computer 115 of the calibration apparatus 105. The process 400 may begin after the lidar sensor 100 is removed from the host vehicle and mounted to the calibrator base 125. Alternatively, the jig 110 may be placed over the lidar sensor 100 while the lidar sensor 100 is still attached to the host vehicle. In some instances, the jig 110 may be a room with protrusions 135 built into the walls of the room and a door for allowing the host vehicle, technicians, or both to access the room. The process 400 may continue to execute until the lidar sensor 100 is calibrated. The process 400 may be performed by the control computer 115, and specifically, the computer processor 150.

At block 405, the lidar sensor 100 is activated. The lidar sensor 100 may be activated after the lidar sensor 100 is connected to the power supply 120 and after the power supply 120 begins providing electrical energy to the lidar sensor 100. The computer processor 150 may be programmed to activate the lidar sensor 100 by providing various control signals to the lidar sensor 100, including outputting an activation control signal to activate the lidar sensor 100.

At block 410, the control computer 115 collects data output by the lidar sensor 100. The data, referred to as "texture data", may include the distances of the lidar sensor 100 to one or more of the protrusions 135, recesses 155, or both, on the interior surface 140 of the jig 110. The computer processor 150 may be programmed to collect the texture data output by the lidar sensor 100.

At block 415, the control computer 115 deactivates the lidar sensor 100. The computer processor 150 may be programmed to turn off the lidar sensor 100 by transmitting a deactivation control signal to the lidar sensor 100. The lidar sensor 100 may power down as a result of receiving the deactivation control signal. In some instances, the deactivation control signal electrically disconnects the lidar sensor 100 from the power supply 120.

At decision block 420, the control computer 115 determines whether the texture data captured by the lidar sensor 100 is accurate. For instance, the computer processor 150 may be programmed to compare the texture data determined by the lidar sensor 100 to the known texture of the interior surface 140 of the jig 110 used during the calibration test. If the computer processor 150 determines that the texture of the interior surface 140 of the jig 110 determined by the lidar sensor 100 is accurate, the process 400 may proceed to block 425. Otherwise, the process 400 may proceed to block 430.

At block 425, the control computer 115 determines that the lidar sensor 100 is properly calibrated. The computer processor 150 may be programmed to output an alert indicating as much. The alert may be presented via a user interface, which could include a display screen, a light, a speaker, or some other way to indicate that the lidar sensor 100 is calibrated. The process 400 may end after block 425.

At block 430, the control computer 115 determines the form factor of the lidar sensor 100. The form factor may be determined via communication with the lidar sensor 100, via a user input, or some other way. The computer processor 150 may be programmed to communicate directly with the lidar sensor 100 to determine the form factor, which may be stored in the memory of the lidar sensor 100. Alternatively, the computer processor 150 may be programmed to receive a user input indicating the form factor. That is, a technician may select or type in the form factor for the lidar sensor 100 into the control computer 115, and the control computer 115 may proceed with that user input as the form factor. Another way to determine the form factor is for the computer processor 150 to be programmed to access the form factor of the lidar sensor 100 from the computer memory 145. In some possible implementations, block 430 may occur earlier in the process 400, such as before the lidar sensor 100 is activated, so the computer processor 150 can use such data when it compares the texture data to the known texture of the interior surface 140 of the jig 110.

At block 435, the control computer 115 calibrates the lidar sensor 100. That is, based on the form factor and the differences between the texture data and the known texture, the computer processor 150 may be programmed to calibrate the lidar sensor 100 by determining and applying appropriate corrections for the lidar sensor 100. Applying appropriate corrections may occur in the form of updating values or the weighting of values in the software of the lidar sensor 100. The computer processor 150 may be programmed to upload the appropriate corrections via direct communication with the lidar sensor 100.

The process 400 may proceed to block 405 after, e.g., the lidar sensor 100 is rebooted with the updated values. The process 400 may continue to repeat until, e.g., block 425 is executed.

Figure 5:
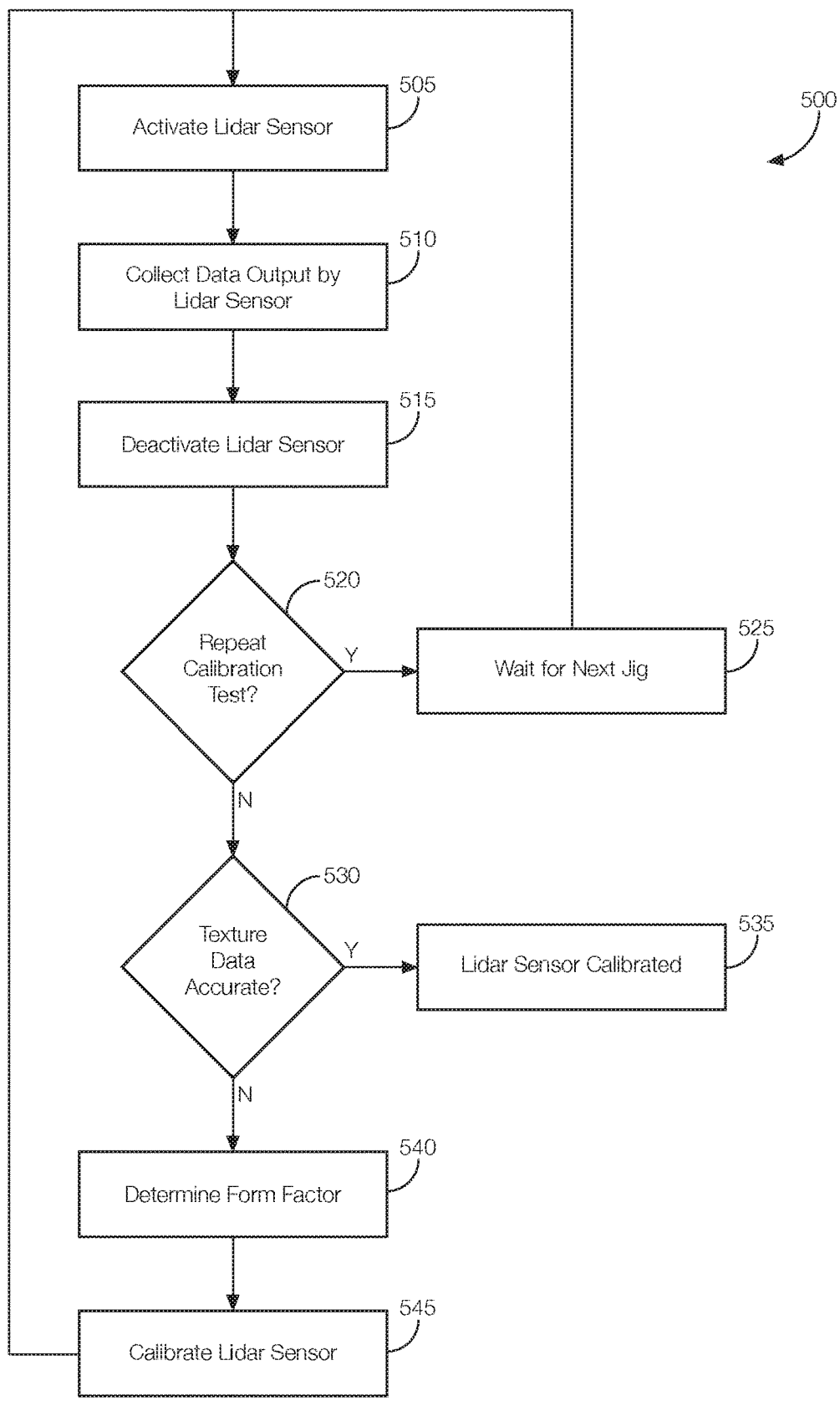
FIG. 5 is a flowchart of another example process that may be executed by a control computer of the calibration apparatus.

FIG. 5 is a flowchart of another example process 500 that may be executed by the control computer 115. The process 500 may begin after the lidar sensor 100 is removed from applied usage (host vehicle, drone, etc.) and mounted to the calibrator base 125. Alternatively, the jig 110 may be placed over the lidar sensor 100 while the lidar sensor 100 is still attached to the host vehicle. In some instances, the jig 110 may be a room with protrusions 135 built into the walls of the room and a door for allowing the host vehicle, technicians, or both to access the room. The process 500 may continue to execute until the lidar sensor 100 is calibrated. The process 500 may be performed by the control computer 115, and specifically, the computer processor 150.

At block 505, the lidar sensor 100 is activated. The lidar sensor 100 may be activated after the lidar sensor 100 is connected to the power supply 120 and after the power supply 120 begins providing electrical energy to the lidar sensor 100. The computer processor 150 may be programmed to activate the lidar sensor 100 by providing various control signals to the lidar sensor 100, including an activation control signal to activate the lidar sensor 100.

At block 510, the control computer 115 collects texture data output by the lidar sensor 100. The texture data may represent the texture (e.g., the locations and distances of at least some of the protrusions 135 and recesses 155) of the interior surface 140 of the jig 110. The computer processor 150 may be programmed to collect the texture data output by the lidar sensor 100.

At block 515, the control computer 115 deactivates the lidar sensor 100. The control computer 115 may turn off the lidar sensor 100 by transmitting a deactivation control signal to the lidar sensor 100. The lidar sensor 100 may power down as a result of receiving the deactivation control signal. The computer processor 150 may be programmed to output the deactivation signal. In some instances, the deactivation control signal electrically disconnects the lidar sensor 100 from the power supply 120.

At decision block 520, the control computer 115 determines whether to repeat the calibration test with a different jig 110. For instance, the computer processor 150 may be programmed to determine that the calibration test should be repeated with a jig 110 of a different size, texture, or both. For example, the control computer 115 may elect to repeat the calibration test with the second jig 110B after performing the calibration test with the first jig 110A. In such instances, the process 500 may proceed to block 525. Otherwise, the process 500 may proceed to block 530. In some possible approaches, the computer processor 150 may be programmed to determine that the calibration test should be repeated with a different jig 110 a predetermined number of times. The predetermined number of times may correspond to the number of jigs 110 available, the number of jigs 110 of different sizes, the number of jigs 110 with different interior surface 140 textures, or the like. Thus, if two jig sizes or textures are available or required given the desired precision for the calibration test, the computer processor 150 may be programmed to cause the process 500 to proceed to block 525 the first time block 520 is executed and to block 530 the second time the process 500 is executed. That count may reset upon the process 500 reaching block 530 so, e.g., the calibration test can proceed with multiple jigs 110 should the process 500 need to repeat after, e.g., decision block 530.

At block 525, the control computer 115 waits for the first jig 110A to be removed and a new jig (i.e., the second jig 110B) to be placed over the lidar sensor 100. The computer processor 150 may be programmed to wait a predetermined amount of time or for the technician to provide a user input indicating that the jig 110 has been replaced. The user input may also provide information about the new jig 110, including the size of the new jig 110, the texture of the interior surface of the new jig, etc. In some instances, the user input may include a unique identifier that the control computer 115 can use to identify characteristics of the new jig 110. From the characteristics, the computer processor 150 may be programmed to determine the texture of the interior surface 140 of the new jig 110. The process 400 proceeds to block 505 from block 530.

At decision block 530, the control computer 115 determines whether the texture data captured by the lidar sensor 100 is accurate. For instance, the computer processor 150 may be programmed to compare the texture data to the known texture of the interior surface 140 of the jig 110 used during the calibration test. If the computer processor 150 determines that the distances determined by the lidar sensor 100 are accurate, the process 500 may proceed to block 535. Otherwise, the process 500 may proceed to block 540.

At block 535, the control computer 115 determines that the lidar sensor 100 is properly calibrated. The computer processor 150 may be programmed to output an alert indicating as much. The alert may be presented via a user interface, which could include a display screen, a light, a speaker, or some other way to indicate that the lidar sensor 100 is calibrated. The process 500 may end after block 535.

At block 540, the control computer 115 determines the form factor of the lidar sensor 100. The form factor may be determined via communication with the lidar sensor 100, via a user input, or some other way. The computer processor 150 may be programmed to communicate directly with the lidar sensor 100 to determine the form factor, which may be stored in the memory of the lidar sensor 100. Alternatively, the control computer 115 may receive a user input indicating the form factor. That is, a technician may select or type in the form factor for the lidar sensor 100 into the control computer 115, and the control computer 115 may proceed with that user input as the form factor. Another way to determine the form factor is for the computer processor 150 to be programmed to access the form factor of the lidar sensor 100 from the computer memory 145. In some possible implementations, block 540 may occur earlier in the process 500, such as before the lidar sensor 100 is activated.

At block 545, the control computer 115 calibrates the lidar sensor 100. That is, based on the form factor and the differences between the data collected by the lidar sensor 100 and the known distances to the protrusions 135 given the form factor of the lidar sensor 100, the computer processor 150 may be programmed to calibrate the lidar sensor 100 by determining and applying appropriate corrections for the lidar sensor 100. Applying appropriate corrections may occur in the form of updating values or the weighting of values in the software of the lidar sensor 100. The computer processor 150 may be programmed to upload the appropriate corrections via direct communication with the lidar sensor 100.

The process 500 may proceed to block 505 after, e.g., the lidar sensor 100 is rebooted with the updated values. The process 500 may continue to repeat until, e.g., block 535 is executed.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
a first jig having a cylindrical, spherical, triangular, or rectangular shape, wherein an interior surface of the first jig has a plurality of protrusions and recesses, wherein the plurality of protrusions and recesses are arranged in rows and columns on the interior surface of the first jig, and lengths of the protrusions increase row-by-row or column-by-column; and
a computer including a memory and a processor programmed to execute instructions stored in the memory to perform a lidar calibration test, the instructions including:
collecting texture data output by a lidar sensor, the texture data representing a detected texture of an interior surface of a first jig disposed about the lidar sensor;
comparing the texture data output by the lidar sensor to texture data of the interior surface of the first jig, wherein the texture data include distances of respective protrusions or recesses to a center of the first jig;
determining that the lidar sensor needs to be calibrated as a result of comparing the detected texture to the known texture, thereby determining updated correction values for the lidar sensor; and
calibrating the lidar sensor by uploading updated correction values for use with the lidar sensor.

2. The system of claim 1, wherein the computer processor is programmed to activate the lidar sensor by outputting an activation control signal to the lidar sensor prior to collecting texture data output by the lidar sensor.

3. The system of claim 1, wherein the computer processor is programmed to deactivate the lidar sensor by outputting a deactivation control signal to the lidar sensor after collecting the texture data output by the lidar sensor.

4. The system of claim 1, wherein the computer processor is programmed to repeat the lidar calibration test with a second jig, wherein an interior surface of the second jig has a different known texture than the interior surface of the first jig.

5. The system of claim 4, wherein the computer processor is programmed to wait for the first jig to be removed and for the second jig to be disposed about the lidar sensor before repeating the lidar calibration test with the second jig.

6. A calibration apparatus comprising:
a first jig, having a first known texture having a cylindrical, spherical, triangular, or rectangular shape, wherein a surface of an interior of the first jig has a plurality of protrusions and recesses, wherein the plurality of protrusions and recesses are arranged in rows and columns on the interior surface of the first jig, and lengths of the protrusions increase row-by-row or column-by-column;
a lidar sensor placed in the interior of the first jig; and
a control computer programmed to
receive first known texture data describing the first texture of the first jig, the first texture data including distances of respective protrusions or recesses to a center of the first jig;
collect texture data output by the lidar sensor, the texture data representing a detected texture of the interior surface of the first jig as determined by the lidar sensor;
compare the texture data output by the lidar sensor to the first known texture data;
determine that the lidar sensor needs to be calibrated as a result of comparing the texture data to the first known texture, thereby determining updated correction values for the lidar sensor; and
calibrate the lidar sensor by uploading updated correction values for use with the lidar sensor.

7. The calibration apparatus of claim 6, wherein the control computer is programmed to activate the lidar sensor by outputting an activation control signal to the lidar sensor prior to collecting texture data output by the lidar sensor and deactivate the lidar sensor by outputting a deactivation control signal to the lidar sensor after collecting the texture data output by the lidar sensor.

8. The calibration apparatus of claim 6, wherein the control computer is programmed to repeat the lidar calibration test with a second jig, wherein an interior surface of the second jig has a second known texture different from the first known texture.

9. The calibration apparatus of claim 8, wherein the control computer is programmed to wait for the first jig to be removed and the second jig to be disposed about the lidar sensor before repeating the lidar calibration test with the second jig.

10. The system of claim 1, wherein the texture data include the distances of the lidar sensor to the protrusions and recesses of the interior surface of the first jig.

11. The calibration apparatus of claim 6, wherein the texture data include the distances of the lidar sensor to the protrusions and recesses of the interior surface of the first jig.

12. The system of claim 1, wherein each of the edges of each protrusion or recess is rounded, concave, or convex.

13. The control apparatus of claim 6, wherein each of the edges of each protrusion or recess is rounded, concaved, or convex.

* * * * *